(12) United States Patent
Tix et al.

(10) Patent No.: US 8,182,614 B2
(45) Date of Patent: May 22, 2012

(54) METHOD OF CLEANING FAST SETTING MATERIAL SPRAY EQUIPMENT

(75) Inventors: Joseph E. Tix, Hastings, MN (US); Jeffrey N Velgersdyk, Minneapolis, MN (US); Richard D Anderson, Maple Grove, MN (US); Mark T Weinberger, Mounds View, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 12/989,206

(22) PCT Filed: Apr. 8, 2009

(86) PCT No.: PCT/US2009/039912
§ 371 (c)(1),
(2), (4) Date: Nov. 9, 2010

(87) PCT Pub. No.: WO2009/131835
PCT Pub. Date: Oct. 29, 2009

(65) Prior Publication Data
US 2011/0046037 A1    Feb. 24, 2011

Related U.S. Application Data

(60) Provisional application No. 61/047,482, filed on Apr. 24, 2008.

(51) Int. Cl.
*C11D 7/50* (2006.01)

(52) U.S. Cl. .......... 134/38; 510/201; 510/202; 510/212; 510/407

(58) Field of Classification Search .................... 134/38; 510/201, 202, 212, 407
See application file for complete search history.

(56) References Cited

U.S. PATENT DOCUMENTS

| | | | |
|---|---|---|---|
| 5,855,218 A | 1/1999 | Giannetti | |
| 5,916,860 A | 6/1999 | Joye et al. | |
| 5,929,005 A | 7/1999 | Smith | |
| 5,994,282 A * | 11/1999 | Lallier | 510/203 |
| 6,057,276 A * | 5/2000 | Smith | 510/174 |
| 6,159,915 A * | 12/2000 | Machac et al. | 510/201 |
| 6,162,776 A | 12/2000 | Marquis et al. | |
| 6,169,061 B1 | 1/2001 | Machac, Jr. et al. | |
| 6,187,108 B1 | 2/2001 | Machac, Jr. et al. | |
| 6,395,103 B1 * | 5/2002 | Machac et al. | 134/40 |
| 6,482,270 B1 * | 11/2002 | Machac et al. | 134/38 |
| 6,511,547 B1 * | 1/2003 | Sahbari | 134/2 |
| 6,534,461 B2 | 3/2003 | Lallier | |
| 6,608,012 B2 * | 8/2003 | Machac et al. | 510/212 |

(Continued)

OTHER PUBLICATIONS

Graco/Gusmer Fusion Gun Manual, see pp. 19-31.

(Continued)

*Primary Examiner* — Gregory Webb
(74) *Attorney, Agent, or Firm* — Douglas B. Farrow

(57) ABSTRACT

A method of cleaning and flushing a fast-set material spray gun 10 is disclosed which uses, in the preferred embodiment, a mixture of approximately 62.5% DMSO, 32.5% DBE and 5% water. This mixture 12 is non-toxic when atomized and lowers the freezing point of the liquid to below 10° F. Because the solvent is mixed with the purge air and expelled from the gun in atomized form, it is important that a non-toxic solvent be utilized and also important that the freezing point of the mixture be low enough to allow use in colder climates without freezing.

6 Claims, 2 Drawing Sheets

U.S. PATENT DOCUMENTS

| | | | |
|---|---|---|---|
| 2002/0013241 A1* | 1/2002 | Lallier et al. | 510/201 |
| 2002/0032138 A1* | 3/2002 | Lallier | 510/201 |
| 2002/0111284 A1* | 8/2002 | Machac et al. | 510/245 |
| 2002/0142928 A1 | 10/2002 | Machac, Jr. et al. | |
| 2002/0198124 A1* | 12/2002 | Machac et al. | 510/201 |
| 2003/0104960 A1* | 6/2003 | Opre | 510/201 |
| 2003/0119686 A1 | 6/2003 | Machac, Jr. et al. | |
| 2006/0089281 A1 | 4/2006 | Gibson | |
| 2010/0035784 A1* | 2/2010 | Lallier et al. | 510/174 |

OTHER PUBLICATIONS

Graco/Gusmer GX-7 Gun Manual, see pp. 20-21.
Graco/Gusmer GX-8 Gun Manual, see pp. 15-16.
Graco/Gusmer D-Gun Manual, see p. 18.
Graco/Gusmer GAP Pro Gun Manual, see p. 11.
Glas-Craft Probler Dispense Gun Manual, see p. 18.
GlasCraft P2 Dispense Gun Manual, see p. 17.

* cited by examiner

METHOD OF CLEANING FAST SETTING MATERIAL SPRAY EQUIPMENT

TECHNICAL FIELD

This application claims the benefit of U.S. Application Ser. No. 60/971,305 filed Sep. 11, 2007, the contents of which are hereby incorporated by reference. This application also claims the benefit of U.S. Application Ser. No. 61/047,482 filed Apr. 24, 2008, the contents of which are again hereby incorporated by reference.

BACKGROUND ART

Conventional solvents used to clean fast set pumping and spraying equipment while using polyurethanes, polyureas and the like include mineral spirits, xylene, acetone, N-butyl acetate, butyl cellosolve, butyl carbitol, N-butyl alcohol, methyl ethyl ketone (MEK), methyl iso-butyl ketone, Stoddard, glycol ether, N-methylpyrrolidone (NMP) and Dyna-Solve brand of solvent. Many of these materials have some toxicity associated with them.

DISCLOSURE OF THE INVENTION

A method of cleaning and flushing a fast-set material spray gun is disclosed which uses, in the preferred embodiment, a mixture of approximately 62.5% DMSO, 32.5% DBE and 5% water. This mixture is non-toxic when atomized and lowers the freezing point of the liquid to below 10° F. Because the solvent is mixed with the purge air and expelled from the gun in atomized form, it is important that a non-toxic solvent be utilized and also important that the freezing point of the mixture be low enough to allow use in colder climates without freezing.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
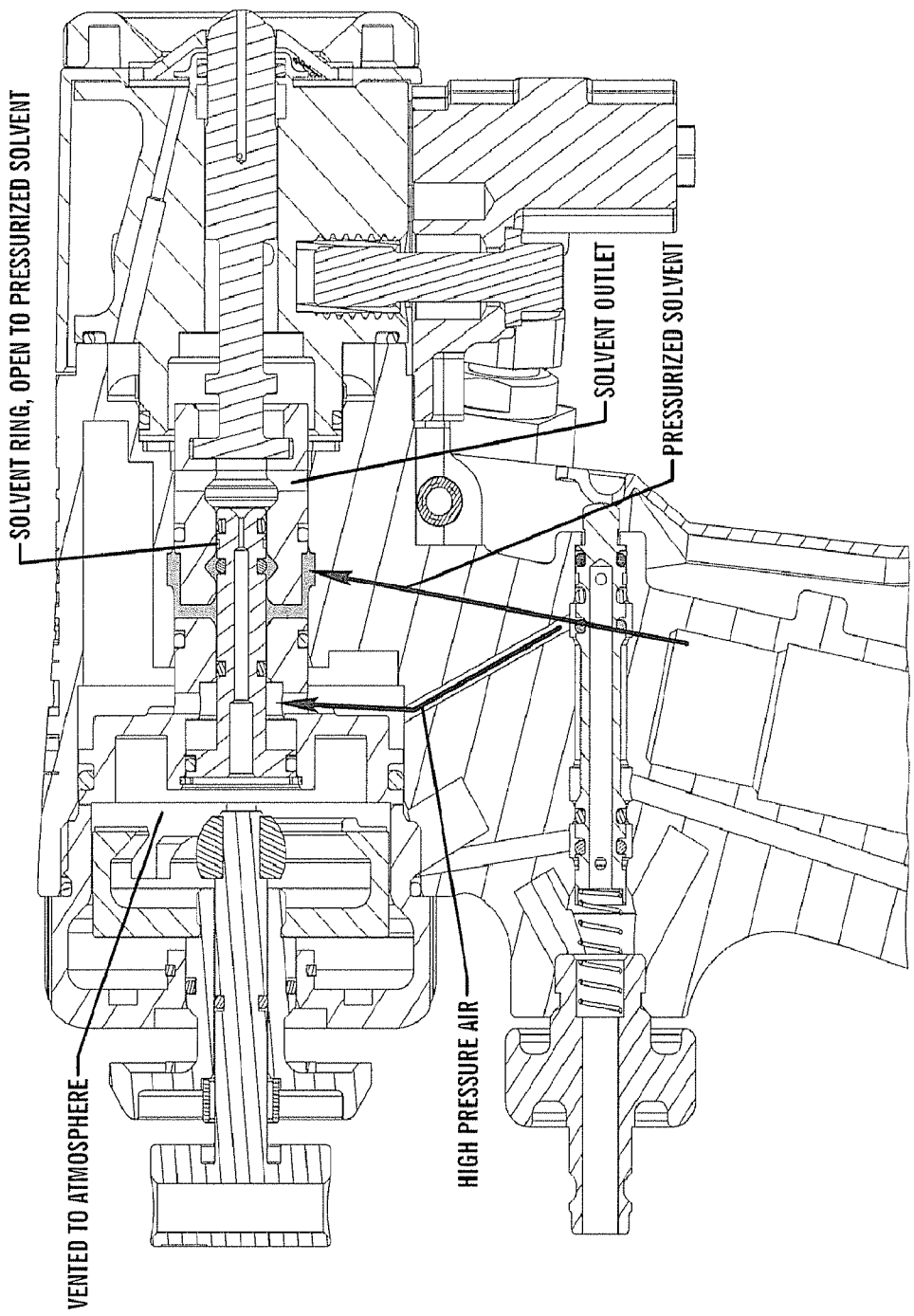
FIG. 1 shows the preferred embodiment of an air purge gun for spraying the fluid utilizing the method of the instant invention with the gun not spraying.
Figure 2:
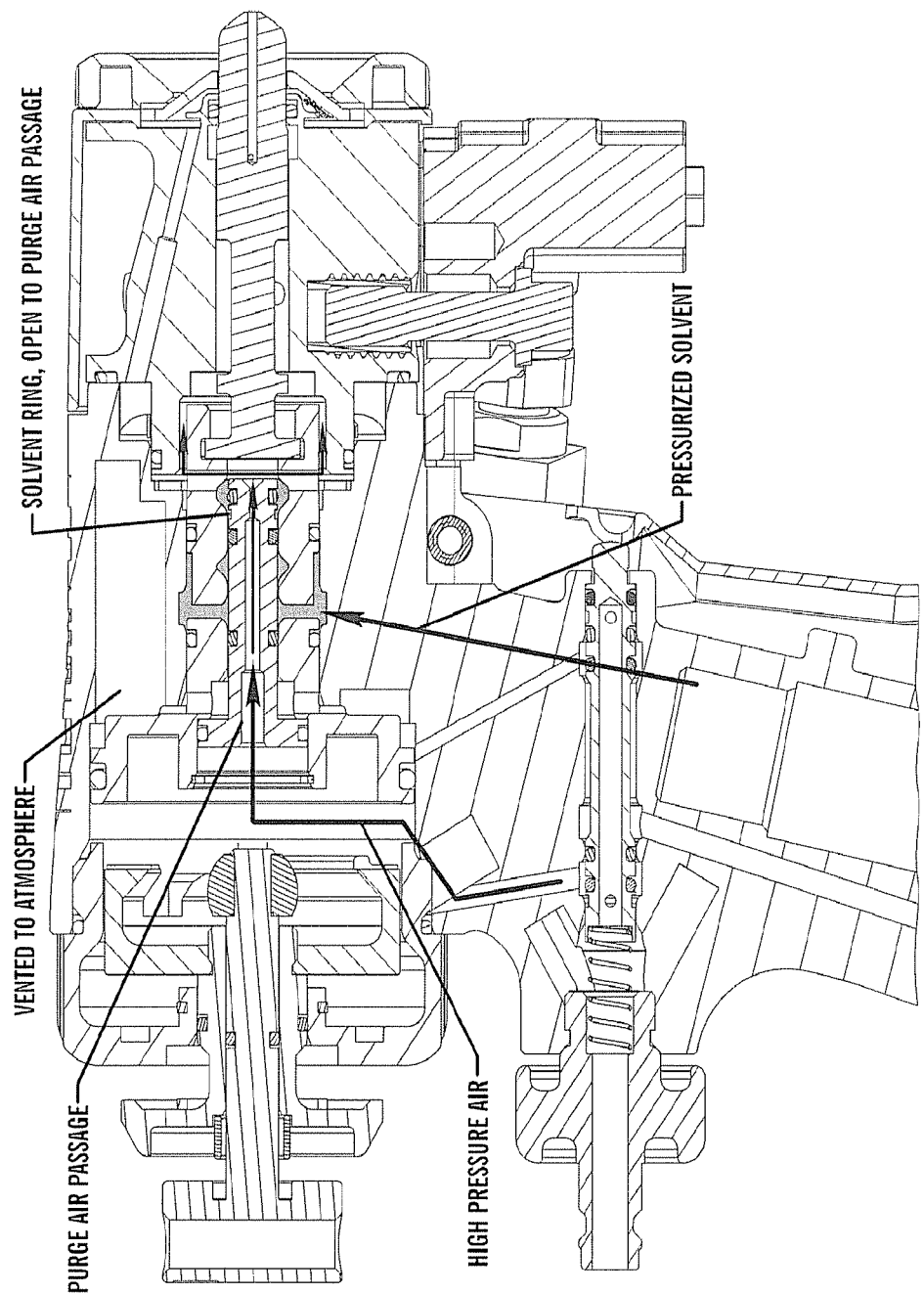
FIG. 2 shows the preferred embodiment of an air purge gun for spraying the fluid utilizing the method of the instant invention with the gun spraying.

A method of cleaning and flushing a fast-set material spray gun 10 is disclosed which uses, in the preferred embodiment, a mixture 12 of approximately 62.5% DMSO (dimethyl sulfoxide), 32.5% DBE (dibasic esther) and 5% water. This mixture 12 is non-toxic when atomized and lowers the freezing point of the liquid to below 10° F. Because the solvent is mixed with the purge air 14 and expelled from the gun 10 in atomized form, it is important that a non-toxic solvent be utilized and also important that the freezing point of the mixture be low enough to allow use in colder climates without freezing.

It is contemplated that various changes and modifications may be made to the cleaning method without departing from the spirit and scope of the invention as defined by the following claims.

The invention claimed is:

1. A method of cleaning an air purge fast-set material spray gun having a purge air passage and comprising the steps of;
   providing a source of a cleaning material comprising DMSO and at least one freezing temperature lowing ingredient; and
   introducing said cleaning material into said purge air passage.

2. The method of claim 1 wherein said freezing temperature lowing ingredient comprises DBE.

3. The method of claim 1 wherein said freezing temperature lowing, ingredient comprises water.

4. The method of claim 1 wherein said freezing temperature lowing ingredients comprises DBE and water.

5. The method of claim 4 wherein said cleaning material, comprises about 62.5% DMSO, 32.5% DBE and 5% water.

6. A method of cleaning an air purge fast-set material spray gun having a purge air passage and comprising the steps of:
   providing a source of a cleaning material comprising DMSO and at least one freezing temperature lowing ingredient, said ingredient comprising DBE and. water; and
   introducing said cleaning material into said purge air passage.

* * * * *